(12) United States Patent
Asari et al.

(10) Patent No.: US 8,277,967 B2
(45) Date of Patent: Oct. 2, 2012

(54) ENERGY DEVICE, METHOD FOR MANUFACTURING THE SAME, AND APPARATUS INCLUDING THE SAME

(75) Inventors: Takuma Asari, Hyogo (JP); Toshiya Yokogawa, Nara (JP); Shigeo Hayashi, Kyoto (JP); Yasuhiro Hashimoto, Nara (JP); Hironori Kumagai, Osaka (JP)

(73) Assignee: Panasonic Corporation, Osaka (JP)

(*) Notice: Subject to any disclaimer, the term of this patent is extended or adjusted under 35 U.S.C. 154(b) by 771 days.

(21) Appl. No.: 12/441,504

(22) PCT Filed: Jan. 22, 2008

(86) PCT No.: PCT/JP2008/050789
§ 371 (c)(1),
(2), (4) Date: Mar. 16, 2009

(87) PCT Pub. No.: WO2008/090876
PCT Pub. Date: Jul. 31, 2008

(65) Prior Publication Data
US 2010/0086837 A1    Apr. 8, 2010

(30) Foreign Application Priority Data

Jan. 26, 2007  (JP) .................. 2007-016919

(51) Int. Cl.
*H01M 6/10* (2006.01)
(52) U.S. Cl. ........................................ 429/94
(58) Field of Classification Search .................. None
See application file for complete search history.

(56) References Cited

U.S. PATENT DOCUMENTS

| | | | | |
|---|---|---|---|---|
| 4,246,326 A | * | 1/1981 | Sprengel et al. | 429/59 |
| 6,031,711 A | | 2/2000 | Tennent et al. | |
| 6,414,836 B1 | | 7/2002 | Tennent et al. | |
| 6,444,357 B1 | * | 9/2002 | Kambe et al. | 429/149 |
| 2003/0030963 A1 | | 2/2003 | Tennent et al. | |
| 2006/0126263 A1 | | 6/2006 | Tsunekawa et al. | |
| 2007/0003838 A1 | * | 1/2007 | Kumashiro et al. | 429/324 |

FOREIGN PATENT DOCUMENTS

| | | |
|---|---|---|
| JP | 2000-208129 | 7/2000 |
| JP | 2001-267188 | 9/2001 |
| JP | 2004-127561 | 4/2004 |
| JP | 2004-200229 | 7/2004 |
| JP | 2005-219954 | 8/2005 |
| JP | 2005-259760 | 9/2005 |
| JP | 2005-353758 | 12/2005 |
| WO | WO 97/43774 | 11/1997 |

* cited by examiner

*Primary Examiner* — Melvin C Mayes
*Assistant Examiner* — Stefanie Cohen
(74) *Attorney, Agent, or Firm* — McDermott Will & Emery LLP

(57) ABSTRACT

The present invention provides an energy device including a carbon nanotube electrode which prevents a carbon nanotube from peeling from an electric conductor. The energy device includes rolled electrode bodies, wherein at least one of the electrode bodies is formed such that a carbon nanotube layer is formed on the electric conductor, and concave regions are formed in a stripe shape on the carbon nanotube layer so as to extend in a direction parallel to a roll axis.

18 Claims, 4 Drawing Sheets

21

21

ENERGY DEVICE, METHOD FOR MANUFACTURING THE SAME, AND APPARATUS INCLUDING THE SAME

PRIORITY

This application is the U.S. National Phase under 35 U.S.C. §371 of International Application No. PCT/JP2008/050789, filed on Jan. 22, 2008, which in turn claims the benefit of Japanese Application No. 2007-016919, filed on Jan. 26, 2007, the disclosures of which Applications are incorporated by reference herein.

TECHNICAL FIELD

The present invention relates to an energy device, a method for manufacturing the energy device, and an apparatus including the energy device.

BACKGROUND ART

Two main types of the energy device are an energy storage device and an energy generating device. Typical examples of the energy storage device are an electrochemical capacitor and a battery, which have already been used in their appropriate markets. Examples of the electrochemical capacitor are: an electric double layer capacitor which uses an activated carbon as a polarizable electrode and utilizes only an electric double layer formed at an interface between a pore surface of the activated carbon and an electrolytic solution; and a redox capacitor which uses a transition metal oxide, such as ruthenium nitrate, whose valence continuously changes, and an electrically-conductive polymer which can be doped. Moreover, two main types of the battery are: a secondary battery which can be charged and discharge by utilizing intercalation and chemical reactions of active materials; and a primary battery which is basically not rechargeable after being discharged once.

The most basic component common to all of these various energy storage devices is an electrode active material which can discharge energy in principle. In addition, to take out the energy stored in the electrode active material, a current collector (electric conductor) is further required, which has electron conductivity and is electrically connected to the electrode active material. Since the current collector needs to transfer the energy of the electrode active material with high efficiency, a metallic material, such as aluminum, copper, or stainless steel, which is very low in resistance is typically used as the current collector. However, in the case of using the electrolytic solution, such as a sulfuric acid aqueous solution, which causes metal to corrode, for example, a rubber-based material to which electrical conductivity is given may be used as the current collector.

As the application of the energy storage device is increasing in recent years, there is a need for the energy storage device which has excellent properties, i.e., which is lower in resistance and can discharge higher current. First, these properties were expected of the electric double layer capacitor which was the lowest in resistance in principle among the energy storage devices, and the electric double layer capacitor having such properties were realized by disposing a carbon-based electrically-conductive layer on a joint surface between the electrode active material and the current collector. Since an electronic resistance in the electrode active material of the electric double layer capacitor is comparatively lower than those of the other secondary batteries, a contact resistance between the electrode active material and the current collector accounts for a nonnegligible percentage with respect to the resistance of a device, so that the carbon-based electrically-conductive layer is disposed on the joint surface. At present, similar technical trend to the above has been pursued for a lithium secondary battery.

To solve the above problems, an energy device has been studied which uses as the electrode active material a carbon nanotube whose one end is connected to the current collector (see Patent Document 1 for example). The carbon nanotube is a hollow carbon material having a minimum diameter of 0.4 nm and a maximum length of 4 mm. Unlike conventional pellet electrodes, a carbon nanotube electrode in which one end of the carbon nanotube is connected to a substrate does not require an electric conduction assisting material and a binding material. Therefore, a volume fraction of the active material is 100%. In addition, since the carbon nanotube is connected to the current collector that is the substrate, the carbon nanotube electrode is very low in electrical resistance. Further, the carbon nanotube has an extremely high ideal specific surface area of 2,625 $m^2/g$, and is especially suitable to be applied to the electric double layer condenser.

However, in the case of forming the energy device having a rolled structure using the current collector having flexibility, the problem arises where a carbon nanotube layer floats or peels. Therefore, it has been extremely difficult to apply the carbon nanotube electrode to the energy device having the above structure.

Patent Document 2 discloses that in the rolled-structure lithium secondary battery, a slit is formed in an active material non-coated region located along a long side of the substrate itself. This prevents wavy distortion and wrinkles of the substrate, which are generated by pressure applied by a roll press because of the difference in thickness between an active material coated region and the active material non-coated region. Patent Document 2 does not describe that the carbon nanotube is used as the active material, and the non-coated region is formed to extend in a direction parallel to a short side of the substrate. Moreover, Patent Document 2 does not describe the problem of peeling of the substrate and the active material due to rolling.

Patent Document 3 discloses that in an electrode for use in a lithium secondary battery in which a thin film of a metal alloyed with lithium is formed on the substrate, voids of a predetermined pattern are selectively formed on the thin film. This is to absorb volume expansion caused by the intercalation of the lithium ion at the time of charging. Moreover, Patent Document 3 does not describe that the carbon nanotube is used as the active material, and does not describe the problem of peeling of the substrate and the active material due to rolling.

Patent Document 4 describes that in the electric double layer capacitor including the polarizable electrode formed by the carbon nanotube formed on an electrode forming region of the substrate, the carbon nanotube is formed in the electrode forming region except for a predetermined region. This aims to obtain large electric capacity from initial charging and discharging and obtain large electric capacity even at low temperature, by facilitating impregnation of an inside of the carbon nanotube with the electrolytic solution. Moreover, Patent Document 4 does not describe the rolling of the substrate and the problem of peeling of the substrate and the active material due to the rolling.

Patent Document 1: Japanese Laid-Open Patent Application Publication No. 2005-353758
Patent Document 2: Japanese Laid-Open Patent Application Publication No. 2000-208129

Patent Document 3: Japanese Laid-Open Patent Application Publication No. 2004-127561

Patent Document 4: Japanese Laid-Open Patent Application Publication No. 2005-259760

DISCLOSURE OF THE INVENTION

Problems To Be Solved By the Invention

A technical object achieved by the present invention is to solve the above problems. That is, an object of the present invention is to provide a rolled-structure energy device which includes a rolled electrode body having a carbon nanotube, prevents the carbon nanotube from peeling from the electric conductor and reduces the possibility of floating and peeling of the carbon nanotube layer, a method for manufacturing the energy device, and an apparatus including the energy device.

Means For Solving the Problems

The present inventors have presumed that the carbon nanotube peels from the electric conductor in the roll-type carbon nanotube electrode because stress is generated in the carbon nanotube layer due to rolling of the electrode body, so that load is applied to a connection portion of the carbon nanotube and the electric conductor. As a result of diligent studies, the present inventors have found that the above problem can be solved by forming a region, which absorbs the stress, in a predetermined shape on the carbon nanotube layer. Thus, the present invention has been achieved.

That is, a first invention of the present invention is an energy device including at least a pair of rolled electrode bodies, wherein: at least one of the electrode bodies is configured such that a carbon nanotube layer is formed on an electric conductor; and concave regions are formed on the carbon nanotube layer in a stripe shape so as to extend in a direction parallel to a roll axis.

An object of the present invention is to prevent peeling caused due to stress generated by rolling in a rolled-structure energy device. Therefore, the concave regions are formed in a stripe shape so as to extend in one direction parallel to the roll axis. In contrast, Patent Document 4 described as above does not disclose the rolled-structure energy device but discloses that impregnation of a flat capacitor with the electrolytic solution is facilitated by forming the concave regions on the flat capacitor. Therefore, Patent Document 4 does not limit the direction in which the concave region extends and the shape of the concave region, and can achieve its object even if the concave region extends in any direction and has any shape.

It is preferable that the carbon nanotube layer on which the concave regions are formed in the stripe shape so as to extend in the direction parallel to the roll axis be provided on an outer surface of the rolled electric conductor.

Moreover, it is preferable that the carbon nanotube layer on which the concave regions are formed in the stripe shape so as to extend in the direction parallel to the roll axis be formed on each of an outer surface of the rolled electric conductor and an inner surface of the rolled electric conductor.

In the energy device, it is preferable that pitches of the concave regions gradually increase as a distance from the roll axis increases.

It is preferable that the carbon nanotube layer be formed such that one ends of carbon nanotubes are electrically connected to the electric conductor. It is preferable that the electric conductor in the concave region be covered with the carbon nanotube.

Moreover, it is preferable that a water-repellent film be provided on the electric conductor in the concave region. It is more preferable that the water-repellent film be formed by a fluorine-based material.

Further, it is preferable that the electric conductor be formed by metallic foil or electrically-conductive rubber.

A second invention of the present invention is a method for manufacturing the energy device according the first invention of the present invention, including the steps of: forming a catalyst metal layer on the electric conductor; and forming the carbon nanotube layer on the catalyst metal layer by chemical vapor deposition, wherein in the step of forming the catalyst metal layer, a region where a catalyst metal does not exist is formed on the electric conductor.

In a first aspect of the second invention of the present invention, in order to form on the electric conductor the region where the catalyst metal does not exist, the step of forming the catalyst metal layer on the electric conductor is carried out with the electric conductor covered with a patterning mask.

In a second aspect of the second invention of the present invention, in order to form on the electric conductor the region where the catalyst metal does not exist, after the water-repellent film is formed on the electric conductor with the electric conductor covered with a patterning mask, the step of forming the catalyst metal layer on the electric conductor is carried out by dip coating to form the catalyst metal layer on a region where the water-repellent film is not formed.

A third invention of the present invention is a method for manufacturing the energy device according to the first invention of the present invention, including the steps of: forming a catalyst metal layer on the electric conductor; forming the carbon nanotube layer on the catalyst metal layer by chemical vapor deposition; and forming the concave regions on the carbon nanotube layer.

It is preferable that the energy device according to the first invention of the present invention be included in a portable device having a radio communication function, an information processing terminal, or a transporting device.

Effects of the Invention

Since the energy device of the present invention can absorb the stress generated by the rolling of the electrode body at the connection portion of the electric conductor that is a supporting member and the carbon nanotube, it can prevent the carbon nanotube from peeling from the electric conductor and significantly reduce the possibility of floating and peeling of the carbon nanotube layer, without using the binding material made of, for example, resin.

Thus, it is possible to suppress the manufacturing cost of the energy device including the carbon nanotube electrode, reduce the rejection rate of the energy device, and improve the long-term reliability of the energy device. Further, since the mechanical and electrical connection between the electric conductor and the carbon nanotube has become strong, large current discharge can be carried out by the energy device using the carbon nanotube electrode.

The energy device of the present invention has the above effects, and this means that conditions for including the energy device having the carbon nanotube electrode in a portable device, an information processing terminal, or a transporting device including a radio communication device have been satisfied. Especially, since the energy device of the present invention can carry out the large current discharge, it is possible to increase an operating time of the portable device, such as a mobile phone which instantaneously and drastically consumes energy, having a radio communication function, and an operating time of the information processing terminal, such as a notebook computer. In addition, it is possible to improve an accelerating performance of the transporting device, such as a hybrid vehicle.

Best Mode for Carrying out the Invention

The present invention is applicable to all types of energy storage devices, such as an electric double layer capacitor, an electrochemical capacitor, a lithium ion capacitor, a lithium ion secondary battery, and an organic battery. The energy device of the present invention is not especially limited as long as an electrode body of the energy device is formed such that a layer made of carbon nanotube is formed on an electric conductor. In the following, the electrode body may be referred to as a carbon nanotube electrode.

In the electric double layer capacitor and the electrochemical capacitor, the carbon nanotube can be used for both positive and negative electrodes.

In the lithium ion secondary battery, typically, a silicon compound, a lithium metal, or a lithium oxidized metal, such as a lithium cobalt oxide is used as the positive electrode, and graphite or the like is used as the negative electrode. In this case, instead of the graphite used as the negative electrode, the carbon nanotube having the same graphene structure as the graphite can be used. Further, in the positive electrode, the carbon nanotube can be used as a supporting material of an active material.

In the lithium ion capacitor, an activated carbon is suggested as the positive electrode, and the graphite is suggested as the negative electrode. Therefore, the carbon nanotube can be used for both positive and negative electrodes.

In the organic battery, an organic material is suggested to be used as the active material of at least one of the electrodes, and the carbon nanotube can be used as the supporting material of the organic material.

As described above, in the present invention, the carbon nanotube itself may serve as an electrode active material, or may serve as the supporting material of the other electrode active material.

An average diameter of the carbon nanotube is in a range from about 0.1 to 100 nm. However, considering that a lithium ion having an ion radius of 0.074 nm or an electrolyte ion having an ion radius of about 0.5 nm enters the carbon nanotube, the average diameter of the carbon nanotube is desirably in a range from 0.1 to 10 nm, and more desirably in a range from 0.1 to 5 nm.

It is preferable that a distance between the carbon nanotubes be short for attaining high density. However, the distance between the carbon nanotubes is set such that the electrolyte ion in an electrolytic solution can adequately move.

It is preferable that a carbon nanotube layer of the present invention be formed such that one end of the carbon nanotube is electrically connected to the electric conductor, and the other end and side surface of the carbon nanotube are practically separated from the electric conductor. This increases the surface area of the electrode active material and improves an energy density of the energy device.

Preferably, since a catalyst metal is interposed between the electric conductor and the end portion of the carbon nanotube connected to the electric conductor, and the electric conductor and the carbon nanotube are electrically connected to each other, the carbon nanotube serves as the electrode active material. Examples of a method for synthesizing the carbon nanotube on the surface of the electric conductor are chemical vapor deposition, laser ablation, arc discharge, and electrolytic synthesis in solution. Note that the catalyst metal may move to the tip end of the carbon nanotube depending on synthesis conditions. Even in this case, the electrical connection between the carbon nanotube and the electric conductor is maintained.

Metallic foil can be used as the electric conductor which also serves as the supporting member of the carbon nanotube. Typically, aluminum foil is used as the electric conductor. However, copper foil, stainless steel foil, iron, nickel, chromium, or tungsten may be used as the electric conductor depending on the maximum potential applied thereto. If necessary, a clad material formed by bonding different metals together can be used as a case. In this case, only the metal on the carbon nanotube side, i.e., on the inner surface side serves as the current collector. Moreover, electrically-conductive rubber, such as butylene rubber, can be used as the electric conductor.

Examples of the catalyst metal are nickel, iron, cobalt, copper, yttrium, rhodium, palladium, chromium, zinc, silicon, sulfur, gold, and boron. The catalyst metal is determined depending on the carbon nanotube and its synthetic method. Catalyst metallic particles increase in size by heating or preheating at the time of synthesizing the carbon nanotube. It is commonly said that a diameter of the catalyst metallic particle increased in size and a diameter of the carbon nanotube synthesized are correlated to each other. In a case where the desired diameter of the carbon nanotube is 1 to 100 nm, it is desirable that the diameter of the catalyst metallic particle at the maximum applied temperature be 1 to 100 nm. For example, in a case where the catalyst metal is formed by vacuum deposition, it is desirable that the thickness of a catalyst metal layer be 0.1 to 10 nm.

Hereinafter, the present invention will be explained in reference to the drawings.

A first invention of the present invention relates to a rolled-structure energy device including at least a pair of rolled electrode bodies.

FIG. 1(a) is a perspective view showing a state where the electrode body of the rolled-structure energy device of the first invention of the present invention is rolled. FIG. 1(b) is a perspective view showing a state where the rolled electrode body is formed integrally with a sealing member and is inserted into a metal case. As shown in FIGS. 1(a) and 1(b), an energy device element 11 is configured such that a cathode 13 to which a cathode lead wire 12 is connected and an anode 15 to which an anode lead wire 14 is connected are rolled with a separator 16 interposed therebetween. A sealing member 17 made of rubber is attached to the cathode lead wire 12 and anode lead wire 14 of the energy device element 11. Further, the energy device element 11 is impregnated with a driving electrolytic solution, and is then stored in a bottomed cylindrical metal case 18 made of aluminum. In the state where the energy device element 11 is stored in the metal case 18, the sealing member 17 is located at an opening of the metal case 18. Then, by carrying out horizontal drawing and curling with respect to the opening of the metal case 18, the sealing member 17 is attached to the opening of the metal case 18 to seal the opening of the metal case 18.

A separator does not depend on the type of the energy device in principle. However, in a case where reflow especially needs to be carried out, heat resistance is required for the separator. In a case where the heat resistance is not required of the separator, polypropylene or the like may be used for the separator, and in a case where the heat resistance is required for the separator, a cellulose-based material may be used for the separator.

A material of the electrolytic solution needs to be selected depending on the type of the energy device. To prevent electrochemical decomposition from being caused by a working voltage range, a solvent having an appropriate potential window needs to be selected as a solvent of the electrolytic solution. It is possible to use general propylene carbonate, ethylene carbonate, ethyl methyl carbonate, or a mixed solvent thereof. However, in a case where the reflow needs to be carried out, a high-boiling-point solvent, such as sulfolane, is used to prevent the electrolytic solution from boiling at the time of the reflow.

As an electrolyte, various known materials can be used. For example, in the electric double layer capacitor, tetraethylammonium tetrafluoroborate can be used as the electrolyte. In the lithium ion secondary battery, lithium pentafluorophosphate or the like can be used as the electrolyte. By synthesizing the carbon nanotube having the diameter corresponding to the ion diameter of an ionic electrolyte, it is possible to manufacture the energy storage device having the highest energy density per unit weight.

FIGS. 2 and 3 are top views each showing a state where the electrode body is not rolled, which is configured by forming the carbon nanotube layer used in the first invention of the present invention on the electric conductor. In an electrode body 21, a lead wire 22 is connected to an electric conductor 24, and a carbon nanotube layer 23 that is the electrode active material is formed on the electric conductor 24. As shown in FIGS. 2 and 3, the electric conductor 24 is typically a rectangular sheet whose left and right sides are short sides and whose upper and lower sides are long sides. The electric conductor 24 is rolled in a direction toward the right side such that the left side at which the lead wire 22 is located becomes the center of the roll.

On the carbon nanotube layer 23, a plurality of concave regions 25 are formed in a stripe shape so as to extend in a direction parallel to a roll axis. Since the electrode body 21 shown in FIGS. 2 and 3 is rolled in a direction from the left side toward the right side, the left side is located near a central axis of the roll. That is, the "direction parallel to a roll axis" denotes a vertical direction in FIGS. 2 and 3. Note that the "roll axis" denotes the center of the roll, and does not denote a core as a material. Moreover, "parallel" does not denote parallel in strict sense, and slight inclination (about 30 degrees for example) may be acceptable as long as the effects of the present invention can be obtained.

In the present invention, the "concave region" denotes a region which is lower in height than the carbon nanotube layer 23 located around this concave region. As shown in cross-sectional views of FIG. 4, the concave region 25 may be a region where the carbon nanotube does not exist at all (FIG. 4(a)). Moreover, the concave region 25 may be a region where the carbon nanotube exists but is lower in height than the carbon nanotube layer 23 located around the concave region 25 (FIG. 4(b)). Further, the concave region 25 may be a region where a cut portion is formed by cutting out a part of the carbon nanotube layer 23 formed on the entire surface of the electric conductor 24 or a region where a groove portion is formed by cutting out using a blade, such as a razor, the carbon nanotube layer 23 formed on the entire surface of the electric conductor 24 (FIG. 4(c)).

Among these, it is preferable that in the concave region, the surface of the electric conductor be not exposed but be covered with the carbon nanotube as in the configurations shown in FIGS. 4(b) and 4(c). According to these configurations shown in FIGS. 4(b) and 4(c), it is possible to prevent the decomposition of the electrolytic solution which is caused by the application of the voltage in a state where the electrolytic solution and the electric conductor are in direct contact with each other. In addition, it is possible to minimize the reduction in the electric capacity caused due to the reduction in the carbon nanotube layer which provides capacity. Especially, the configuration shown in FIG. 4(b) is more preferable.

In a case where the carbon nanotube does not exist at all in the concave region as in FIG. 4(a), a water-repellent film made of a fluorine-based material, a silane-based material, or the like may be formed on the electric conductor in the concave region. With this, direct contact between the electrolytic solution and the electric conductor can be prevented, thereby avoiding the problem of decomposition of the electrolytic solution.

A large number of the concave regions are formed in a direction parallel to the roll axis so as to extend preferably from the upper side to lower side of the electric conductor. With this, when rolling the electrode body, the stress applied to the carbon nanotube layer 23 can be absorbed, and the carbon nanotube can be prevented from peeling from the electric conductor.

Generally, in a case where the electrode in which an active material layer is formed on the electric conductor is rolled, tensile stress is applied to the active material layer on the surface located outside the roll (on the outer surface of the rolled electric conductor), while compressive stress is applied to the active material layer on the surface located inside the roll (on the inner surface of the rolled electric conductor). In the case of the electrode formed by the application of the conventional activated carbon, the tensile stress is absorbed on the outer surface by cracks formed in the vertical direction on an activated carbon layer. Therefore, the activated carbon layer is unlikely to peel. However, since load is applied to a connection portion of the activated carbon layer and the electric conductor by the compressive stress on the inner surface, the activated carbon layer is likely to peel.

However, as a result of studies, the present inventors have found that in a case where the carbon nanotube electrode of the present invention is rolled, the carbon nanotube layer on the outer surface of the roll is likely to peel, unlike the case where the electrode formed by the application of the conventional activated carbon is rolled. Reasons for this may be as below. In the carbon nanotube layer formed such that one ends of the carbon nanotubes are connected to the electric conductor, some gaps each extending in the vertical direction between the carbon nanotubes are formed. Therefore, the carbon nanotube layer is lower in an electrode density than the activated carbon layer (the density of the activated carbon layer is 0.3 to 0.8 g/cc, whereas the density of the carbon nanotube layer is 0.03 g/cc). Therefore, even if the compressive stress is applied to the inner surface, there is room for the increase in the electrode density, and the carbon nanotube layer is unlikely to peel. In contrast, since the carbon nanotubes intertwine with each other in the carbon nanotube layer, the outer surface is likely to be affected by the load caused by the tensile stress, and the peeling is likely to occur at the interface between the substrate and the carbon nanotube layer.

Because of the above reasons, it is preferable that in the present invention, to reduce the tensile stress, the concave regions be formed in a stripe shape so as to extend in a direction parallel to the roll axis on the carbon nanotube layer disposed on the outer surface from which the carbon nanotube layer is likely to peel. It is preferable that the concave regions be formed only on an outer carbon nanotube layer, since this simplifies the manufacturing process.

Moreover, it is also preferable that the concave regions be formed in a stripe shape on both outer and inner carbon nanotube layers so as to extend in a direction parallel to the roll axis. It is preferable that the concave regions be formed on both carbon nanotube layers, since the electric capacities become equal on both surfaces of the electrode body.

An optimal value of a horizontal width of the concave region 25 (a horizontal width of a white portion sandwiched between the carbon nanotube layers 23 in FIG. 2) and an optimal value of the pitch of the concave region 25 (a horizontal width of the carbon nanotube layer 23 in FIG. 2) change depending on the thickness of the electric conductor, the thickness of the carbon nanotube layer, the distance between the cathode lead wire and the anode lead wire, the number of turns of the electrode body, and the like. The pitches of the concave regions 25 may be substantially constant as shown in FIG. 2. However, since the diameter of the roll is small near the rolled axis, but the diameter of the roll increases as a distance from the rolled axis increases, it is preferable that the pitches of the concave regions 25 be set to increase as the distance from the roll axis (left side) increases as shown in FIG. 3. With this, the stress can be absorbed efficiently. In a case where the concave regions are formed on both the carbon nanotube layer on the outer surface and the carbon nanotube layer on the inner surface, it is preferable that in order to efficiently absorb both the compressive stress and the tensile stress, the horizontal width of the concave region 25 of the outer carbon nanotube layer be set to be larger than that of the inner carbon nanotube layer when compared to each other using portions having the same curvature.

There are two methods for forming the concave region 25. One is a method A for forming the concave region 25 before synthesizing the carbon nanotube, and the other is a method B for forming the concave region 25 after synthesizing the carbon nanotube.

In the method A, in a step of forming on the electric conductor the catalyst metal layer necessary for the growth of the carbon nanotube, a region where the catalyst metal does not exist is formed on the electric conductor. Specifically, the catalyst metal layer is formed by patterning only on the region where the carbon nanotube layer is formed. Examples of a method for patterning the catalyst metal layer are: a method for forming the catalyst metal layer directly on the electric conductor in a predetermined pattern by ink jet printing; a method for with the electric conductor covered with a patterning mask having a predetermined pattern, forming the catalyst metal layer by plating, dip coating, spin coating, or physical vapor deposition, such as vacuum deposition or sputtering, with respect to the electric conductor; and a method for with the electric conductor covered with the patterning mask having the predetermined pattern, forming a water-repellent film by wet coating or physical vapor deposition, such as vacuum deposition, with respect to the electric conductor, and then forming the catalyst metal layer by the dip coating with respect to the electric conductor on which the water-repellent film is formed.

Examples of the method B are: a method for forming the carbon nanotube layer on the entire surface of the electric conductor, and press the carbon nanotube layer with a die having a predetermined pattern to compress a part of the carbon nanotube, thereby forming the concave region; a method for mechanically peel or remove a part of the carbon nanotube to form the concave region; and a method for forming the concave region formed by the groove portion without peeling the carbon nanotube layer. In the case of pressing the carbon nanotube layer with the die having the predetermined pattern, the pressed carbon nanotube remains on the electric conductor. However, since a space is formed between non-pressed regions, the stress can be absorbed. In the case of mechanically peeling or removing a part of the carbon nanotube, the carbon nanotube layer formed on the entire surface of the electric conductor is peeled or removed by scratching the carbon nanotube with, for example, a metal wire, thereby forming the concave region. In the case of forming the concave region formed by the groove portion, the groove portion may be formed by using, for example, a blade, such as a razor, with respect to the carbon nanotube layer formed on the entire surface of the electric conductor.

In the case of forming the electric conductor using a roll press, desired surface roughness (projections and depressions) can be formed on the electric conductor by forming, for example, projections and depressions on the surface of the roll. By utilizing the surface roughness formed by the roll press, the concave region can be formed.

EXAMPLES

Hereinafter, the present invention will be explained in detail with Examples. However, the present invention is not limited to these Examples.

Example 1

In a state where a striped patterning mask having a slit width of 4 mm and a slit-to-slit distance of 1 mm covers each of both surfaces of the aluminum foil (thickness of 15 μm) that is the electric conductor, Fe that is the catalyst metal of the carbon nanotube is electron-beam-evaporated on each surface of the aluminum foil so as to have a thickness of 1 nm. Then, the carbon nanotubes are formed on the surfaces of these Fe films, each having a width of 4 mm and formed at intervals of 1 mm, by thermal CVD at 800° C. using methanol as a carbon source. Thus, a bundle of carbon nanotubes each having the width of 4 mm and formed at intervals of 1 mm are vertically formed on both surfaces of the aluminum foil. That is, one end of the bundle is connected to the surface of the aluminum foil.

Then, as shown in FIG. 1, the lead wires are connected to the cathode and the anode, respectively, each formed by the electrode body formed as above. With the separator interposed between the cathode and the anode, these components are rolled. Then, the rolled components are impregnated with the electrolytic solution, and are stored in the case. Thus, the rolled energy device is manufactured. Although both electrodes are taken out from the case after they are stored in the case, and the carbon nanotube electrode is visually examined, the peeling and floating of the carbon nanotube layer are not observed.

Example 2

The electron beam evaporation is carried out without using the patterning mask of Example 1 to form the Fe film having a thickness of 1 nm on the entire surface of the aluminum foil, and the carbon nanotube is formed on the entire surface of the Fe film under the same conditions as Example 1. Then, a part of the carbon nanotube layer is removed by scratching the carbon nanotube layer with the metal wire. Thus, the remaining carbon nanotube layers each has a width of 4 mm and are formed at intervals of 1 mm. Then, the rolled energy device is manufactured in accordance with the same procedure as Example 1. Although the carbon nanotube electrode is visually examined, the peeling and floating of the carbon nanotube layer are not observed.

Example 3

The rolled energy device is manufactured in the same manner as Example 1 except that a patterning mask is used in which the slit width increases by 0.1 mm from 4 up to 8 mm, and the slit-to-slit distance is 1 mm. Although the carbon nanotube electrode is visually examined, the peeling and floating of the carbon nanotube layer are not observed.

Comparative Example 1

The rolled energy device is manufactured in the same manner as Example 1 except that the carbon nanotube layer is formed on the entire surface of the electric conductor without using the patterning mask. As a result of the visual examination of the carbon nanotube electrode, the peeling and floating of the carbon nanotube layer located outside the roll are observed.

After the carbon nanotube electrode obtained as above is rolled to form a column having a diameter of 3 mm, a cross section of the carbon nanotube layer located outside the roll and a cross section of the carbon nanotube layer located inside the roll are photographed. FIGS. 5 and 6 shows electron micrographs (magnification: 2,000 times) of these cross sections. In FIG. 5, a lower dark gray portion denotes the aluminum foil that is the electric conductor, a center light gray portion denotes the carbon nanotube layer, and a circle portion denotes the peeling of the carbon nanotube layer. In FIG. 6, an upper dark gray portion denotes the aluminum foil, and a center light gray portion denotes the carbon nanotube layer. FIG. 6 does not show the peeling of the carbon nanotube layer.

FIG. 7 shows an electron micrograph obtained by photographing a cross section of the carbon nanotube layer under magnification of 30,000 times. It is clear from this micrograph that the carbon nanotubes of the carbon nanotube layer are oriented in a certain direction but intertwine with each other. Since the carbon nanotubes intertwine with each other, the carbon nanotube layer on the outer surface to which the tensile stress is applied may be likely to peel.

In accordance with Examples and Comparative Example described as above, the present invention can provide the energy device which prevents the carbon nanotube from peeling from the electric conductor.

INDUSTRIAL APPLICABILITY

Since the energy device according to the present invention can discharge large current, it is useful as an energy source or an auxiliary power supply in: a portable device, such as a mobile phone, having a radio communication function; a display apparatus, such as a liquid crystal display; an information processing terminal, such as a computer; a transporting device, such as a vehicle or a bicycle; or a medical device, such as an implantable artificial heart.

BRIEF DESCRIPTION OF THE DRAWINGS

FIG. 4(a) shows a case where the concave region is a region where the carbon nanotube does not exist at all.

FIG. 4(b) shows a case where the concave region is a region where the carbon nanotube exists but is lower in height than the carbon nanotube layer 23 located around the concave region.

FIG. 4(c) shows a case where the concave region is a region where the cut portion is formed by cutting out a part of the carbon nanotube layer 23 formed on the entire surface of the electric conductor 24.

Figure 1:
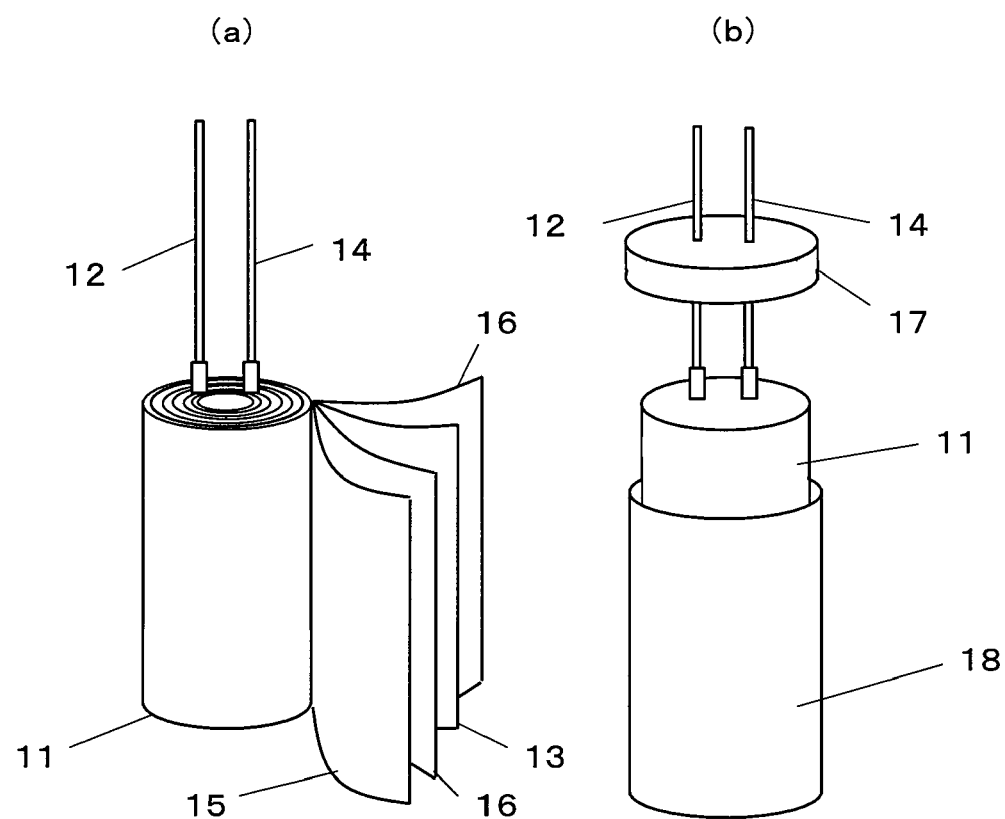
FIG. 1(a) is a perspective view showing a state where the electrode body of the rolled-structure energy device of the first invention of the present invention is rolled.
FIG. 1(b) is a perspective view showing a state where the rolled electrode body of the rolled-structure energy device of the first invention of the present invention is formed integrally with the sealing member and is inserted into the metal case. The pitches of the concave regions 25 are substantially the same as each other
Figure 2:
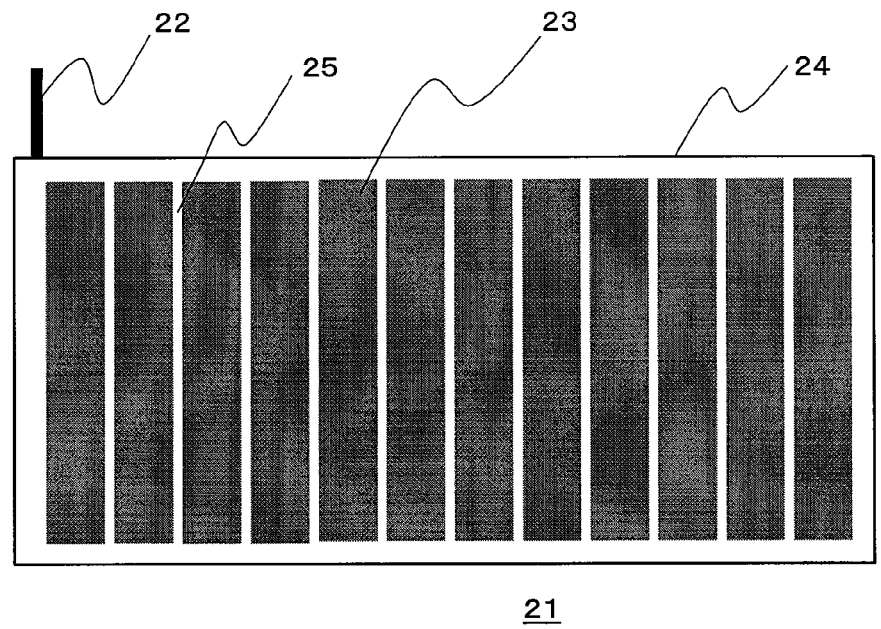
FIG. 2 is a top view showing a state where the electrode body is not rolled, which is configured by forming the carbon nanotube layer used in the first invention of the present invention on the electric conductor. The pitches of the concave regions 25 are substantially the same as each other.
Figure 3:
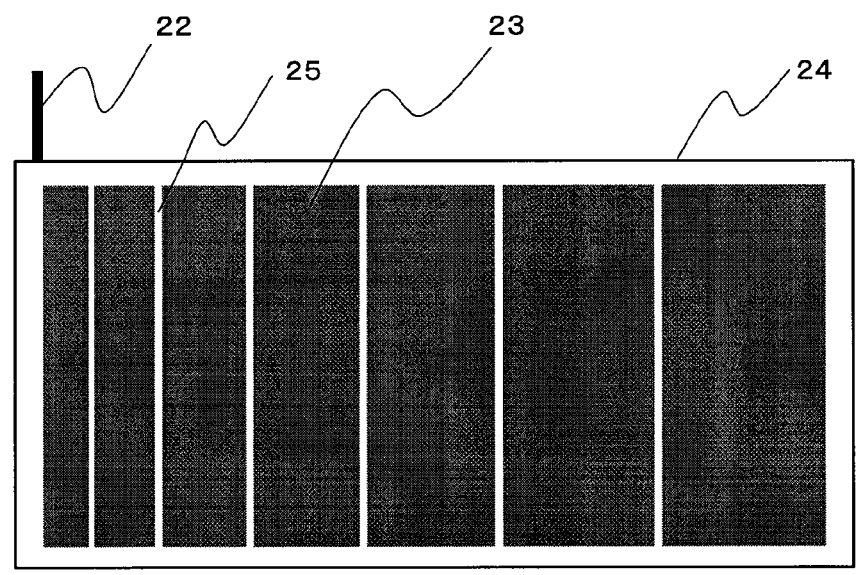
FIG. 3 is a top view showing a state where the electrode body is not rolled, which is configured by forming the carbon nanotube layer used in the first invention of the present invention on the electric conductor. The pitches of the concave regions 25 gradually increase as the distance from the roll axis (left side) increases.
Figure 4:
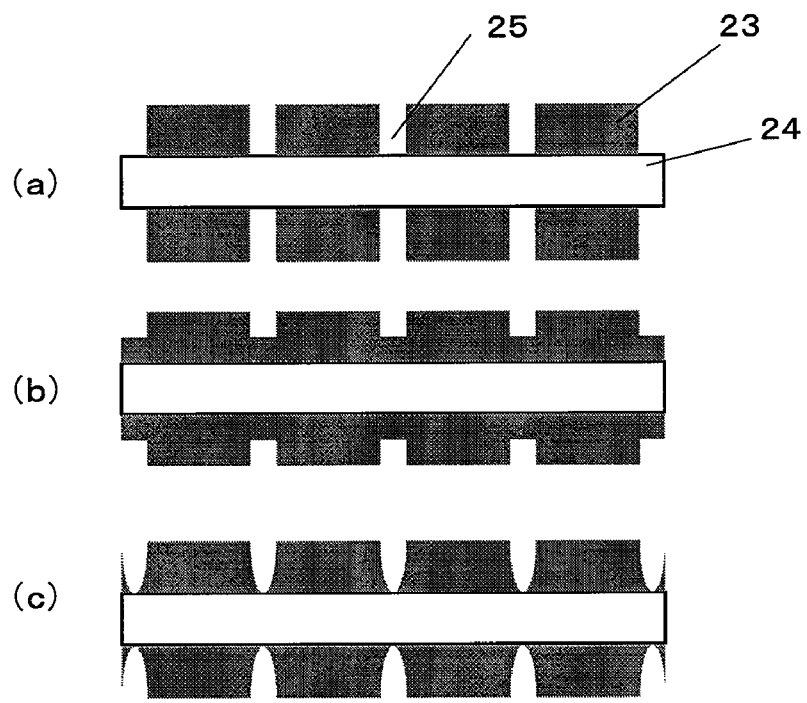
FIG. 4 are partial cross-sectional views of the electrode body shown in FIG. 2, and show cases where the carbon nanotube layer is formed on each of both surfaces of the electric conductor.
Figure 5:
FIG. 5 shows an electron micrograph (magnification: 2,000 times) obtained by photographing a cross section of the carbon nanotube layer located outside the roll.
Figure 6:
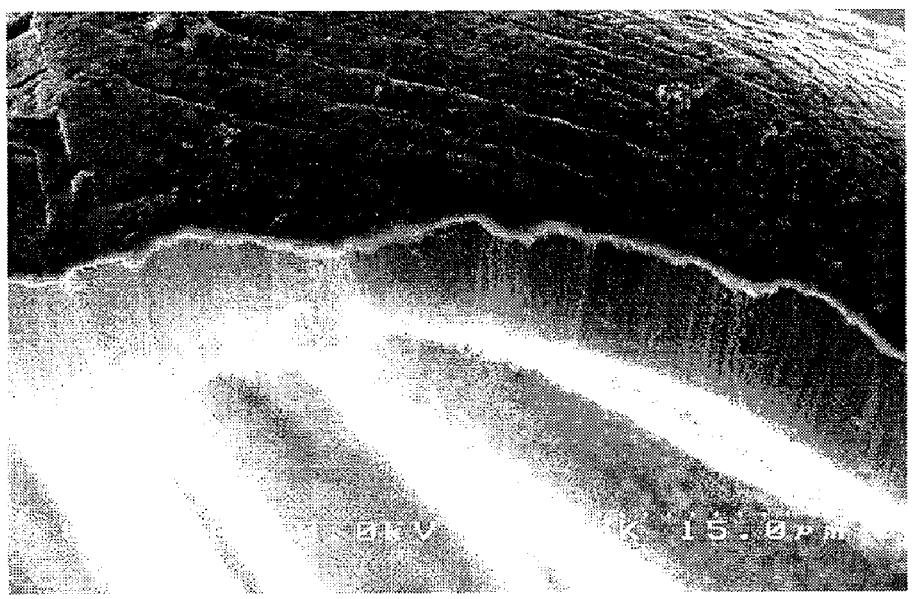
FIG. 6 shows an electron micrograph (magnification: 2,000 times) obtained by photographing a cross section of the carbon nanotube layer located inside the roll.
Figure 7:
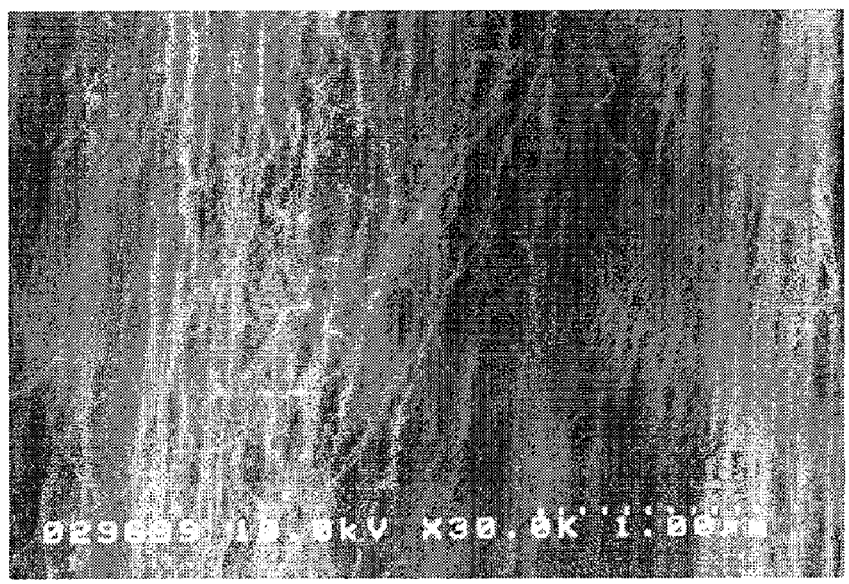
FIG. 7 shows an electron micrograph obtained by photographing a cross section of the carbon nanotube layer under magnification of 30,000 times.

EXPLANATION OF REFERENCE NUMBERS 11 energy device element
12 cathode lead wire
13 cathode
14 anode lead wire
15 anode
16 separator
17 sealing member
18 metal case
21 electrode body
22 lead wire
23 carbon nanotube layer
24 electric conductor
25 concave region

The invention claimed is:

1. An energy device comprising at least a pair of rolled electrode bodies that are a cathode and an anode, wherein:
   at least one of the electrode bodies is configured such that a carbon nanotube layer is formed on an electric conductor,
   concave regions are formed on the carbon nanotube layer in a stripe shape so as to extend in a direction parallel to a roll axis, and
   the electric conductor in the concave region is covered with the carbon nanotube so that the electric conductor is not exposed in the concave region.

2. The energy device according to claim 1, wherein the carbon nanotube layer on which the concave regions are formed in the stripe shape so as to extend in the direction parallel to the roll axis is provided on an outer surface of the rolled electric conductor.

3. The energy device according to claim 1, wherein the carbon nanotube layer on which the concave regions are formed in the stripe shape so as to extend in the direction parallel to the roll axis is formed on each of an outer surface of the rolled electric conductor and an inner surface of the rolled electric conductor.

4. The energy device according to any one of claims 1 to 3, wherein pitches of the concave regions gradually increase as a distance from the roll axis increases.

5. The energy device according to claim 1, wherein the carbon nanotube layer is formed such that one ends of carbon nanotubes are electrically connected to the electric conductor.

6. The energy device according to claim 1, wherein the electric conductor is formed by metallic foil or electrically-conductive rubber.

7. A method for manufacturing the energy device according to claim 1, the method comprising the steps of:
forming a catalyst metal layer on the electric conductor;
forming the carbon nanotube layer on the catalyst metal layer by chemical vapor deposition; and
forming the concave regions on the carbon nanotube layer.

8. A portable device having a radio communication function, comprising the energy device according to claim 1.

9. An information processing terminal comprising the energy device according to claim 1.

10. A transporting device comprising the energy device according to claim 1.

11. An energy device comprising at least a pair of rolled electrode bodies that are a cathode and an anode, wherein:
at least one of the electrode bodies is configured such that a carbon nanotube layer is formed on an electric conductor,
concave regions are formed in a stripe shape so as to extend in a direction parallel to a roll axis,
the carbon nanotube does not exist in the concave region, and
a water-repellent film is provided on the electric conductor in the concave region.

12. The energy device according to claim 11, wherein the water-repellent film is formed by a fluorine-based material.

13. The energy device according to claim 11, wherein the carbon nanotube layer is provided on an outer surface of the rolled electric conductor.

14. The energy device according to claim 11, wherein the carbon nanotube layer is formed on each of an outer surface of the rolled electric conductor and an inner surface of the rolled electric conductor.

15. The energy device according claim 11, wherein pitches of the concave regions gradually increase as a distance from the roll axis increases.

16. A method for manufacturing the energy device according to claim 11, the method comprising the steps of:
forming a catalyst metal layer on the electric conductor; and
forming the carbon nanotube layer on the catalyst metal layer by chemical vapor deposition, wherein
in the step of forming the catalyst metal layer, a region where a catalyst metal does not exist is formed on the electric conductor.

17. The method according to claim 16, wherein in order to form on the electric conductor the region where the catalyst metal does not exist, the step of forming the catalyst metal layer on the electric conductor is carried out with the electric conductor covered with a patterning mask.

18. The method according to claim 16, wherein in order to form on the electric conductor the region where the catalyst metal does not exist, after the water-repellent film is formed on the electric conductor with the electric conductor covered with a patterning mask, the step of forming the catalyst metal layer on the electric conductor is carried out by dip coating or spin coating to form the catalyst metal layer on a region where the water-repellent film is not formed.

* * * * *